U S 0 1 2 1 3 8 8 9 3 B 2

US012138893B2

(12) United States Patent
Naderi et al.

(10) Patent No.: US 12,138,893 B2
(45) Date of Patent: Nov. 12, 2024

(54) METHOD FOR FORMING A PVOH BASED BARRIER LAYER ON A SUBSTRATE

(71) Applicant: BILLERUDKORSNAS AB, Solna (SE)

(72) Inventors: Ali Naderi, Arboga (SE); Johan Larsson, Gavle (SE)

(73) Assignee: BILLERUDKORSNAS AB, Solna (SE)

( * ) Notice: Subject to any disclaimer, the term of this patent is extended or adjusted under 35 U.S.C. 154(b) by 219 days.

(21) Appl. No.: 17/296,093

(22) PCT Filed: Nov. 27, 2019

(86) PCT No.: PCT/EP2019/082769
§ 371 (c)(1),
(2) Date: May 21, 2021

(87) PCT Pub. No.: WO2020/109401
PCT Pub. Date: Jun. 4, 2020

(65) Prior Publication Data
US 2022/0009212 A1 Jan. 13, 2022

(30) Foreign Application Priority Data

Nov. 27, 2018 (EP) .................................... 18208433
Nov. 27, 2018 (EP) .................................... 18208434

(51) Int. Cl.
| | |
|---|---|
| *C08J 5/00* | (2006.01) |
| *B05D 1/38* | (2006.01) |
| *B05D 3/02* | (2006.01) |
| *B32B 27/30* | (2006.01) |
| *B65D 25/14* | (2006.01) |
| *B65D 65/42* | (2006.01) |
| *B65D 85/72* | (2006.01) |
| *C09D 5/00* | (2006.01) |
| *C09D 129/04* | (2006.01) |
| *D21H 19/20* | (2006.01) |
| *D21H 27/10* | (2006.01) |

(52) U.S. Cl.
CPC ................ *B32B 27/30* (2013.01); *B05D 1/38* (2013.01); *B05D 3/0254* (2013.01); *B65D 25/14* (2013.01); *B65D 65/42* (2013.01); *B65D 85/72* (2013.01); *C08J 5/00* (2013.01); *C09D 5/00* (2013.01); *C09D 129/04* (2013.01); *D21H 19/20* (2013.01); *D21H 27/10* (2013.01); *B05D 2203/00* (2013.01); *B05D 2507/005* (2013.01)

(58) Field of Classification Search
CPC ........ B65D 2565/387; B65D 2565/388; B32B 27/306; B32B 29/00; B32B 2307/724; B32B 2307/7242; B32B 2307/7244; B32B 2307/7246; B32B 2317/12; B32B 2329/04; B32B 2349/00; B05D 1/38; B05D 3/0254; B05D 2203/00; B05D 2507/005
USPC ......................................... 427/333, 340, 411
See application file for complete search history.

(56) References Cited

U.S. PATENT DOCUMENTS

| | | | | |
|---|---|---|---|---|
| 8,293,347 | B2 * | 10/2012 | Kruger | ................... B32B 23/08 |
| | | | | 215/12.2 |
| 8,409,679 | B2 * | 4/2013 | Bentmar | ............... B32B 27/306 |
| | | | | 156/244.11 |
| 2007/0295466 | A1 * | 12/2007 | Fugitt | .................... D21H 19/12 |
| | | | | 162/290 |
| 2016/0017166 | A1 | 1/2016 | Zischka et al. | |
| 2017/0136747 | A1 * | 5/2017 | Torradas | ............... B32B 29/002 |

FOREIGN PATENT DOCUMENTS

| | | | |
|---|---|---|---|
| JP | 2008056775 A | 3/2008 | |
| WO | WO-9619348 A1 * | 6/1996 | ........... C09D 129/04 |
| WO | WO99/46121 A1 | 9/1999 | |
| WO | WO2004/089624 A2 | 10/2004 | |
| WO | WO-2010093366 A1 * | 8/2010 | ............. C08J 7/045 |
| WO | WO2011/061510 A1 | 5/2011 | |
| WO | WO2015/178856 A1 | 11/2015 | |

OTHER PUBLICATIONS

C. A. Finch, Some Properties of Polyvinyl Alcohol and Their Possible Applications, in Chemistry and Technology of Water-Soluble Polymers, 287 (C. A. Finch ed., 1983). (Year: 1983).*

* cited by examiner

*Primary Examiner* — William P Fletcher, III
(74) *Attorney, Agent, or Firm* — Stites & Harbison PLLC; Richard S. Myers, Jr.

(57) ABSTRACT

There is provided a method for the production of a packaging material comprising a substrate and a gas barrier layer based on polyvinyl alcohol (PVOH), said method comprising the steps of —applying a coating composition of said PVOH dissolved in a first solvent onto said substrate to form a coating —subjecting the coating to a first drying step to form a dried PVOH-based coating on said substrate, contacting the dried PVOH-based coating with a crosslinking solution comprising a crosslinking agent in a second solvent, to effect crosslinking of the PVOH-based coating, and —subsequent to the contact with the crosslinking solution, subjecting the PVOH-based coating to a second drying step, forming the PVOH-based barrier layer on said substrate, with the proviso that if the crosslinking solution comprises PVOH, the amount of PVOH added by the crosslinking solution is less than 20% (by weight), such as less than 10% (by weight), of the amount of PVOH added by the coating composition.

14 Claims, No Drawings

METHOD FOR FORMING A PVOH BASED BARRIER LAYER ON A SUBSTRATE

CROSS REFERENCE TO RELATED APPLICATIONS

This application is a § 371 National Phase Application of PCT/EP2019/082769 filed Nov. 27, 2019, which claims priority to EP18208433.5 filed Nov. 27, 2018 and EP18208434.3 filed Nov. 27, 2018.

TECHNICAL FIELD

The present disclosure relates to the field of packaging materials, and in particular to an improved PVOH-based barrier layer and methods for its manufacture, as well as packaging materials comprising said barrier layer and packages made thereof, in particular packages for sensitive products, such as but not limited to food, beverages, and pharmaceuticals.

BACKGROUND

The packaging manufacturing industry faces a major challenge to develop concepts that enable the production of packages based on sustainable resources, and which can be produced at significantly lower energy consumption levels than currently is the case. This concerns in particular those segments of industry that produce packaging for sensitive products such as food, beverages and pharmaceuticals.

Currently, these packaging products contain several layers of fossil-based polymers such as polyethylene, and aluminum, which shield the sensitive content from odor, moisture, oxygen and light—in varying ambient conditions (e.g. humidity and temperature). It is interesting to note that even though aluminum constitutes the smallest barrier component in the packaging product, the aluminum accounts for most of the energy that is consumed in the packaging manufacturing process. Efforts to replace these materials are ongoing, but not free from challenges.

Polyvinyl alcohol (PVOH) is a non-ionic water-soluble polymer that possesses attractive properties, such as biodegradability and the ability to form effective barrier layers against grease and oil, including mineral oils. Furthermore, the hydrogen bonds between the hydroxyl groups of the polymer chains together with the semi-crystalline structure of the polymer enable the formation of dense layers, which make PVOH one of the best available polymer-based gas barriers. Finally, PVOH is an approved material for food packaging, in accordance to official regulations such as those issued by the German Bundesinstitut für Risikobewertung (BfR) or the U.S. Food and Drug Administration (FDA); hence, PVOH is a highly attractive material for the packaging industry.

WO 2013/064500 (Johan Larsson and Anders Karlsson) discloses a curtain coatable gas barrier coating composition comprising a polymer and a surfactant, wherein the polymer is selected from a group consisting of polyvinyl alcohol and polysaccharides, or mixtures thereof, wherein said polysaccharides are soluble or dispersable or suspendable in water and the surfactant is a water soluble non-ionic ethoxylated alcohol. WO 2013/064500 also relates to a method for providing a substrate with a gas barrier layer by means of the coating composition, and a coated substrate having at least one gas barrier layer obtained by coating the substrate with the coating composition. Further, WO 2013/064500 relates to a packaging material comprising a coated paperboard coated with the coating composition, and a liquid package comprising such a packaging material.

However, a major impediment for the wider implementation of PVOH as an effective barrier in the packaging industry is the hydrophilicity of the polymer, which gravely diminishes the effectiveness of the barrier at high humidity (>50% RH) conditions.

There are different approaches to addressing this deficiency. It has for example been attempted to improve the barrier properties of PVOH films by adding nanofillers. Nanofillers are particles characterized by high surface areas and high aspect ratios. The high surface areas and aspect ratios are beneficial in barrier applications, since the particles, when applied optimally, make the diffusion of the gas molecules through the coating layer more difficult. However, an optimal application (homogeneous distribution) of the nanofiller particles in polymer matrixes is difficult to achieve through industrially relevant, i.e. simple and affordable, processes.

This is explained by the high aspect ratios and surface areas of nanofillers, which lead to severe aggregation of the nanoparticles. Hence, excessive amounts of the nanofiller, such as >>10% (w/w) based on the amount of the polymer matrix, must be used for achieving attractive gas barrier properties. This shortcoming is problematic, as the stress-points that are caused by the nanofiller aggregates can lead to the deterioration of the mechanical properties of the nano-composite.

Another approach for the improvement of barrier properties of PVOH in humid conditions is the crosslinking of the PVOH polymer chains. This is generally brought about by the mixing of PVOH and a crosslinking agent prior to application of the formulation onto the substrate and the subsequent drying. However, as the following citations will demonstrate, this approach often involves the employment of chemicals or processes that are not preferentially used in the pulp and paper industry. More significantly, the improvements that have been achieved by this route are seemingly modest.

For example, U.S. Pat. No. 6,444,750 (Robert E. Touhsaent) discloses a coating solution comprising PVOH blended with a formaldehyde-containing crosslinking agent and crosslinking-promoting acid catalyst wherein the solution has a pH of about 3.5 or less. The examples indicate that some reduction of OTR was achieved, but it should be noted that all measurements were performed at 0% RH.

In a more recent study (Lim et al., 2016), the oxygen-barrier and water-resistance properties of poly(vinyl alcohol) blended with poly(acrylic acid) for packaging applications were investigated. Here PVOH was crosslinked using polyacrylic acid through an esterification process, which required the drying of the coating for one hour at 150° C. The authors reported an improvement of about three times, when the barrier properties were measured at 0% RH.

In WO2010/129032, Carrie A. Feeney et al. reported improvements in the barrier properties of anionic polymer-nanofiller compositions obtained by first forming a stable aqueous emulsion of an anionically functionalized matrix resin, a platy mineral filler and optional additives, applying this emulsion to a substrate, drying the emulsion to form a barrier film, and treating the dried barrier film with a multi-valent metal crosslinking agent. Oxygen transmission rates (OTR, in cubic centimeters per square meter per day at 1 atmosphere) were analyzed over a series of relative humidities (RH) and ambient temperature and pressure using an Illinois Instrument 8001 or 8011 oxygen permeation analyzer. It is noted that the oxygen transmission rate increased as the relative humidity increased. It is also of interest to note that a rinsing process using distilled water was employed prior to the drying of the crosslinked films; an extra step which complicates the manufacturing process.

There has also been indications (see Labuschagne et al., 2008) that the gas barrier properties of PVOH could improve by the densification of the amorphous part of the semi-crystalline PVOH layer. The densification of the amorphous parts of the PVOH layer can be achieved through an inter-polymer complexation process. This is obtained through the addition of minute amounts of a polymer, which can strongly interact with PVOH through strong hydrogen bonding interactions. Labuschagne et al. reported a three-time improvement in the barrier property upon the addition of 20% (w/w) poly(methyl vinyl ether co-maleic acid) to PVOH. It is noted that the barrier layer was evaluated at 80% RH.

WO 2004/089624 (A. J. Kruger and P. A. Truter) concerns the use of an inter-polymer complexation concept. In this application the inventors exemplified their invention with a formulation that on the dry basis consisted of 30% (w/w) poly(methyl vinyl ether co-maleic acid) and 70% (w/w) PVOH. It is interesting to note that the barrier properties improved by three times for a 25 μm barrier layer based on the said formulation, which is not an extraordinary achievement.

It remains to make available PVOH-based barrier layers that perform well at high humidity conditions, i.e. at 50% RH and higher, and which can be produced by processes suitable for industrial application.

SUMMARY

The present disclosure sets out to address the problems of the prior art, and makes available an improved method for forming a PVOH-based barrier layer, a PVOH-based barrier layer exhibiting excellent barrier properties at high humidity conditions, i.e. at 50% RH and higher, packaging materials comprising said barrier layer, as well as packaging products, i.e. packages and in particular packages for sensitive products such as food, beverages and pharmaceuticals.

According to a first aspect, the present disclosure makes available a method for the production of a packaging material comprising a substrate and a gas barrier layer based on polyvinyl alcohol (PVOH). The method comprises the steps of:
  applying a coating composition of said PVOH dissolved in a first solvent onto said substrate to form a coating
  subjecting the coating to a first drying step to form a dried PVOH-based coating on said substrate,
  contacting the dried PVOH-based coating with a crosslinking solution comprising a crosslinking agent and optionally a catalyst in a second solvent, to effect crosslinking of the PVOH-based coating, and
  subsequent to the contact with the crosslinking solution, subjecting the PVOH-based coating to a second drying step, forming the PVOH-based barrier layer on said substrate.

If the crosslinking solution comprises PVOH, one or both of the following restrictions apply:
  The amount of PVOH added by the crosslinking solution is less than 20% (by weight), such as less than 10% (by weight), of the amount of PVOH added by the coating composition.
  The weight ratio of crosslinking agent to PVOH in the crosslinking solution is at least 2:3, preferably at least 1:1, such as at least 3:2.

The reason for limiting the amount of PVOH in the crosslinking solution is that the method of the first aspect will not work if the crosslinking agent is consumed by crosslinking PVOH in the crosslinking solution. In one embodiment, the crosslinking solution comprises no PVOH.

The reason for applying the crosslinking solution to a dried PVOH-based coating is that regions of dense/crystallized PVOH structures separated by regions of less dense/amorphous PVOH is formed in the coating during drying. The latter are more permeable and hence also more accessible for the crosslinking agent. When the less dense/amorphous regions are crosslinked their mobility is reduced and the barrier properties are improved.

In an embodiment of said first aspect, the first drying step is performed at a temperature below the boiling point of said first solvent.

In another embodiment, freely combinable with the first aspect and any embodiment thereof, the dried PVOH-based coating formed after said first drying step is subjected to a heating step, wherein said coating is heated to a temperature above the boiling temperature of said first solvent. This heating step is preferably performed at a temperature in the interval of 101-170° C., more preferably in the interval of 130-160° C., and most preferably in the interval of 140-150° C.

In another embodiment, freely combinable with the first aspect and any embodiments thereof, the crosslinking agent is chosen from glutaraldehyde, glyoxal, and borate derivatives. When the crosslinking agent is glutaraldehyde, the crosslinking solution preferably further comprises a catalyst, such as a zink-based catalyst, e.g. $Zn(NO_3)_2$.

In another embodiment, freely combinable with the first aspect and any embodiment thereof, said second drying step is performed at a temperature below the boiling point of said second solvent.

In yet another embodiment, freely combinable with the first aspect and any embodiment thereof, a second heating step is performed after said second drying step, wherein said dried coating is heated to a temperature above the boiling point of said second solvent. This second heating step is preferably performed at a temperature in the interval of 101-170° C., more preferably in the interval of 130-160° C., and most preferably in the interval of 140-150° C.

In another embodiment, freely combinable with the first aspect and any embodiment thereof, the coating composition is applied to the paper substrate by curtain coating, blade coating, rod coating, spray coating or roller coating, forming a PVOH-based layer on the substrate.

The first and second solvents disclosed in the first aspect and embodiments thereof can be the same or different, and in a preferred embodiment the first and second solvent is water.

In another embodiment, freely combinable with the first aspect and any embodiment thereof, said PVOH has a degree of hydrolysis of about 98 to 100%.

In another embodiment, freely combinable with the first aspect and any embodiment thereof, the PVOH of the coating composition has a weight average molecular weight ($M_w$) in the interval of 20 kg/mol to 300 kg/mol, such as 25 kg/mol to 200 kg/mol, preferably 50 kg/mol to 200 kg/mol, and more preferably about 80 to 200 kg/mol.

In another embodiment, freely combinable with the first aspect and any embodiment thereof, the crosslinking agent, and optionally a catalyst, is applied by curtain coating, blade coating, rod coating, spray coating or roller coating.

In another embodiment, freely combinable with the first aspect and any embodiment thereof, the crosslinking agent is chosen from glutaraldehyde, glyoxal, or borate derivatives.

In yet another embodiment, freely combinable with the first aspect and any embodiment thereof, the degree of crosslinking is controlled by controlling the temperature of the solution comprising a crosslinking agent, and optionally a catalyst, when added to said PVOH-based coating. In this embodiment, the temperature of the solution is preferably in the interval of 10-80° C., such as 40-80° C.

According to a further embodiment, freely combinable with the first aspect and any embodiment thereof, said PVOH has functional groups capable of forming covalent bonds or capable of strongly associating with other chemical components, such as multivalent ions.

Preferably the coating composition further comprises an inter-polymer complexation (IPC) polymer having a weight average molecular weight ($M_w$) in an interval of 10 kg/mol to 10 000 kg/mol, preferably 50 kg/mol to 1000 kg/mol, more preferably 80 kg/mol to 500 kg/mol.

The IPC is preferably a water-soluble polymer exhibiting functional groups capable of forming hydrogen bonds with —OH groups of the PVOH. Accordingly, a repeating unit of said IPC polymer may comprise an amide group, a carboxyl group or a pyrrolidone group. The IPC polymer is for example chosen from polyacrylic acid, polyvinyl pyrrolidone, non-ionic polyacrylamide or poly(methyl vinyl ether-alt-maleic acid).

In yet another embodiment, also combinable with other aspects and embodiments presented herein, the IPC polymer or polymers is present in the coating composition in an interval of 0.5 to 20 weight-%, preferably 0.5 to 10 weight-%, and more preferably 0.5 to 5 weight-%, and most preferably 1.0 to 5 weight-% (based on the weight of the PVOH component).

According to a further embodiment, freely combinable with the first aspect and any embodiment thereof, the coating composition comprises a nanofiller. Said the nanofiller is preferably chosen from bentonite, kaolin or montmorillonite.

According to an embodiment, freely combinable with the first aspect and any embodiment thereof, said nanofiller is present in the interval of about 1 to about 50 weight-%, preferably about 5 to about 30 weight-%, and more preferably about 10 to about 20 weight-% based on the weight of the polymeric compounds.

In yet another embodiment, freely combinable with the first aspect and any embodiment thereof, the coating composition is applied onto a substrate having a moisture content of less than 10%, preferably in the interval of 4-6% (weight/weight).

In an embodiment, freely combinable with the first aspect and any embodiment thereof, the PVOH-based coating is dried to dryness (bone dry, a moisture content of about 0% weight/weight) in said first drying step. In another embodiment, freely combinable with the first aspect and any embodiment thereof, the crosslinked PVOH-based coating is dried to dryness (bone dry, a moisture content of about 0% weight/weight) in said second drying step. Preferably both drying steps are carried out to result in a dry coating leaving said step.

Thus, in a preferred embodiment, the crosslinking agent, and optionally a catalyst, is applied onto a PVOH-based coating having a moisture content of about 0% weight/weight. Following this step, the coating is thoroughly dried, and optionally subjected to a step of heating the dry coating.

In an embodiment, freely combinable with the first aspect and any embodiment thereof, the coating composition is applied onto a paper substrate forming a PVOH-based layer having a coat weight in the interval of 0.8 to 8.0 g/m$^2$, preferably in the interval of 1.2-4.0 g/m$^2$, and more preferably in the interval of 1.6-3.2 g/m$^2$.

In the above aspect and embodiments thereof, said substrate is a fibre based substrate, such as a paper substrate, preferably a paper or paperboard comprising at least one fibre based layer. It is however conceivable that the herein disclosed method is implemented also on other substrates, without going beyond the scope of the claims.

A second aspect of the present disclosure relates to a PVOH-based barrier layer having an oxygen transmission rate (OTR) in the interval 0.1 to 3 ml/m$^2$ day atm measured according to ASTM F 1927-07 at a relative humidity (RH) of 50% and 23° C., preferably an OTR in the interval of 0.1 to 0.15 ml/m$^2$ day atm measured according to ASTM F 1927-7 at a relative humidity (RH) of 50% and 23° C.

Preferably said layer has an OTR in the interval of 0.5 to 3.0 ml/m$^2$ day atm measured according to ASTM F 1927-7 at a relative humidity (RH) of 80% and 23° C., preferably an OTR in the interval of 0.5 to 1.5 ml/m$^2$ day atm measured according to ASTM F 1927-7 at a relative humidity (RH) of 80% and 23° C.

According to an embodiment of said second aspect, said layer has coat weight in the interval of 0.8 to 8.0 g/m$^2$, preferably 1.2-4.0 g/m$^2$, and more preferably 1.6-3.2 g/m$^2$.

As a third aspect, the present disclosure also makes available a packaging material comprising a PVOH-based barrier layer according to the above second aspect and embodiments thereof.

In a preferred embodiment of said third aspect, the present disclosure makes available a packaging material comprising a PVOH-based barrier layer having a coat weight in the interval of 0.8 to 8.0 g/m$^2$, preferably 1.2-4.0 g/m$^2$, and more preferably 1.6-3.2 g/m$^2$ and an OTR in the interval 0.5 to 3 ml/m$^2$ day atm, preferably in the interval 0.5 to 1.5 ml/m$^2$ day atm measured according to ASTM F1927-07 at a relative humidity (RH) of 80% RH and 23° C.

A fourth aspect relates to a package comprising a paper substrate having a PVOH-based layer according to any one of the second aspect and embodiments thereof, or comprising a packaging material according to any one of the third aspect and embodiments thereof. Such package is preferably a package for an edible product, a foodstuff, a beverage or a pharmaceutical. In these applications, for packaging sensitive and/or perishable products, the improved barrier properties become particularly advantageous.

Description

Before the present invention is described, it is to be understood that the terminology employed herein is used for the purpose of describing particular embodiments only and is not intended to be limiting, since the scope of the present invention will be limited only by the appended claims and equivalents thereof.

It must be noted that, as used in this specification and the appended claims, the singular forms "a," "an," and "the" include plural referents unless the context clearly dictates otherwise.

The term "substrate" refers to any substrate for which improved barrier properties are desired, and onto which a PVOH-based coating can be applied. The present disclosure is primarily concerned with cellulose and/or fibre-based substrates, such as films or paper including paperboard made of or comprising cellulose, regenerated cellulose, and/or cellulose fibres.

The term "fibre" encompasses cellulose fibre, such as virgin fibre, for example bleached and/or unbleached kraft pulp, or chemithermomechanical pulp (CTMP), but also includes recirculated fibre, pulped recycled paper, such as pulped newsprint, de-inked pulp (DIP) etc. The term "fibre" also encompasses other natural fibres, as well as synthetic fibres of different composition, length and width.

"Molecular weight" typically refers to weight average molecular weight ($M_w$), which can be determined according to the standard ASTM D4001-13.

According to a first aspect, the present disclosure makes available a method for the production of a packaging material comprising a substrate and a gas barrier layer based on polyvinyl alcohol (PVOH). The method comprises the steps of:

applying a coating composition of said PVOH dissolved in a first solvent onto said substrate to form a coating subjecting the coating to a first drying step to form a dried PVOH-based coating on said substrate, contacting the dried PVOH-based coating with a crosslinking solution comprising a crosslinking agent and optionally a catalyst in a second solvent, to effect crosslinking of the PVOH-based coating, and subsequent to the contact with the crosslinking solution, subjecting the PVOH-based coating to a second drying step, forming the PVOH-based barrier layer on said substrate.

If the crosslinking solution comprises PVOH, one or both of the following restrictions apply:

The amount of PVOH added by the crosslinking solution is less than 20% (by weight), such as less than 10% (by weight), of the amount of PVOH added by the coating composition.

The weight ratio of crosslinking agent to PVOH in the crosslinking solution is at least 2:3, preferably at least 1:1, such as at least 3:2.

In one embodiment, the crosslinking solution comprises substantially no PVOH.

In the method of the first aspect, it is not necessary to rinse the PVOH-based coating before the second drying step. An advantage of the omission of such an intermediate rinsing step, is that the method becomes easier to implement on an industrial scale. An advantage of the use of one or more drying steps and one or more heating steps, is that such steps can be conveniently incorporated into an industrial process.

In an embodiment of said first aspect, the first drying step is performed at a temperature below the boiling point of said first solvent. An advantage of this is that the integrity of the coating is maintained while the polymer chains become more densely stacked before being subjected to the crosslinking agent and optional catalyst.

In another embodiment, freely combinable with the first aspect and any embodiment thereof, the dried PVOH-based coating formed after said first drying step is subjected to a heating step, wherein said coating is heated to a temperature above the boiling temperature of said first solvent. This heating step is preferably performed at a temperature in the interval of 101-170° C., more preferably in the interval of 130-160° C., and most preferably in the interval of 140-150° C.

In another embodiment, freely combinable with the first aspect and any embodiments thereof, the crosslinking agent is chosen from glutaraldehyde, glyoxal, and borate derivatives.

As shown in the experimental section below, the crosslinking is particularly effective if the temperature of the crosslinking solution is raised above room temperature. As an example, the crosslinking solution that is contacted with the dried PVOH-based coating may have a temperature of at least 40° C., such as 40-99° C., such as 45-95° C., such as 45-80° C. In another embodiment, freely combinable with the first aspect and any embodiment thereof, said second drying step is performed at a temperature below the boiling point of said second solvent.

In yet another embodiment, freely combinable with the first aspect and any embodiment thereof, a second heating step is performed after said second drying step. This second heating step is preferably performed at a temperature in the interval of 101-170° C., more preferably in the interval of 130-160° C., and most preferably in the interval of 140-150° C.

The first and second drying steps, as well as the first and second heating steps, can be performed using conventional techniques for heating a substrate, such as a fibre based substrate, for example but not limited to hot air foil dryers, convection dryers, and infrared dryers. The drying is preferably adjusted with regard to temperature and time so that the coated substrate is dried to bone dry without adverse effects on the integrity of the coating, i.e. avoiding the introduction of any surface defects not present already before the drying or heating steps. A skilled person is capable of adjusting the drying and heating steps within the intervals and guidance given herein.

In another embodiment, freely combinable with the first aspect and any embodiment thereof, the coating composition is applied to the paper substrate by curtain coating, blade coating, rod coating, spray coating or roller coating, forming a PVOH-based layer on the paper substrate. A person skilled in the art is well capable of selecting the appropriate coating technique without departing from the scope of this disclosure.

The first and second solvents disclosed in the first aspect and embodiments thereof can be the same or different, and in a preferred embodiment the first and second solvent is water. The inventors have found that the method disclosed herein is so robust, that tap water can be used without any further purification. This is an advantage over prior art processes, where deionized water has been used, and an improvement which makes the process better suited for large scale industrial application.

In another embodiment, freely combinable with the first aspect and any embodiment thereof, said PVOH has a degree of hydrolysis of about 98 to 100%. Different qualities of PVOH having a degree of hydrolysis of about 98-100% are available, for example products having the following $M_w$: 13-23 kg/mol, 27 kg/mol, 31-50 kg/mol, 89-98 kg/mol, 85-124 kg/mol, 125 kg/mol, 130 kg/mol, 145 kg/mol, 146-186 kg/mol, and 195 kg/mol.

In another embodiment, freely combinable with the first aspect and any embodiment thereof, the PVOH of the coating composition has a weight average molecular weight ($M_w$) in the interval of 20 kg/mol to 300 kg/mol, such as 25 kg/mol to 200 kg/mol, preferably 50 kg/mol to 200 kg/mol, and more preferably about 80 to 200 kg/mol.

PVOH-products are frequently characterized by the viscosity of a 4% solution. A skilled person is well familiar with different methods for determining the viscosity of polymers, for example using a capillary-type viscosimeter, for example an Ubbelohde-Type viscometer or an Ostwald-type viscosimeter. Notably PVOH products having a viscosity above 5 mPas have obtained FDA/BfR approval for use in food packaging applications.

In another embodiment, freely combinable with the first aspect and any embodiment thereof, the crosslinking agent, and optionally a catalyst, is applied by curtain coating, blade coating, rod coating, spray coating or roller coating.

In another embodiment, freely combinable with the first aspect and any embodiment thereof, the crosslinking agent is chosen from glutaraldehyde, glyoxal, or borate derivatives.

In yet another embodiment, freely combinable with the first aspect and any embodiment thereof, the degree of crosslinking is controlled by controlling the temperature of the solution comprising a crosslinking agent, and optionally a catalyst, when added to said PVOH-based coating. In this embodiment, the temperature of the solution is preferably in the interval of 10-80° C., such as 40-80° C.

According to a further embodiment, freely combinable with the first aspect and any embodiment thereof, said PVOH has functional groups capable of forming covalent bonds or capable of strongly associating with other chemical components, such as multivalent ions.

Preferably the coating composition further comprises an inter-polymer complexation (IPC) polymer having a weight average molecular weight ($M_w$) in an interval of 10 kg/mol to 10 000 kg/mol, preferably 50 kg/mol to 1000 kg/mol, more preferably 80 kg/mol to 500 kg/mol.

In this embodiment, again freely combinable with other aspects and embodiments presented herein, the IPC polymer is chosen from polyacrylic acid, polyvinyl pyrrolidone, non-ionic polyacrylamide or poly(methyl vinyl ether-alt-maleic acid).

In yet another embodiment, also combinable with other aspects and embodiments presented herein, the IPC polymer or polymers is present in the coating composition in an interval of 0.5 to 20 weight-%, preferably 0.5 to 10 weight-%, more preferably 0.5 to 5 weight-% and most preferably 1.0 to 5.0 weight-% (based on the weight of the PVOH component).

According to a further embodiment, freely combinable with the first aspect and any embodiment thereof, the coating composition comprises a nanofiller. Said the nanofiller is preferably chosen from bentonite, kaolin or montmorillonite.

According to an embodiment, freely combinable with the first aspect and any embodiment thereof, said nanofiller is present in the interval of about 1 to about 50 weight-%, preferably about 5 to about 30 weight-%, and more preferably about 10 to about 20 weight-% based on the weight of the polymeric compounds.

In yet another embodiment, freely combinable with the first aspect and any embodiment thereof, the coating composition is applied onto a substrate having a moisture content of 4-6% (weight/weight).

In an embodiment, freely combinable with the first aspect and any embodiment thereof, the PVOH-based coating is dried to dryness (bone dry, a moisture content of about 0% weight/weight) in said first drying step. In another embodiment, freely combinable with the first aspect and any embodiment thereof, the crosslinked PVOH-based coating is dried to dryness (a moisture content of about 0% weight/weight) also in said second drying step, after the application of the crosslinking agent and optional catalyst. Preferably both drying steps are carried out to result in a bone dry coating leaving each step.

Thus, in a preferred embodiment, the crosslinking agent, and an optional catalyst, is applied onto a PVOH-based coating having a moisture content of about 0% weight/weight.

In an embodiment, freely combinable with the first aspect and any embodiment thereof, the coating composition is applied onto a paper substrate forming a PVOH-based layer having a coat weight in the interval of 0.8 to 8.0 g/m$^2$, preferably in the interval of 1.2-4.0 g/m$^2$, and more preferably in the interval of 1.6-3.2 g/m$^2$.

In the above aspect and embodiments thereof, said substrate is a fibre based substrate, such as a paper substrate, preferably a paper or paperboard comprising at least one fibre based layer. It is however conceivable that the herein disclosed method is implemented also on other substrates, without going beyond the scope of the claims.

A second aspect of the present disclosure relates to a PVOH-based barrier layer having an OTR in the interval 0.1 to 3 ml/m$^2$ day atm measured according to ASTM F1927-07 at a relative humidity (RH) of 50% and 23° C., for example 0.1-0.25 ml/m$^2$ day atm, and preferably an OTR in the interval of 0.1 to 0.15 ml/m$^2$ day atm measured according to ASTM F1927-07 at 50% RH and 23° C.

Preferably said layer has an OTR in the interval of 0.5 to 3 ml/m$^2$ day atm measured according to ASTM F1927-07 also at a relative humidity (RH) of 80% and 23° C., for example 0.5-2.5 ml/m$^2$ day atm, and most preferably an OTR in the interval of 0.5 to 1.5 ml/m$^2$ day atm also when measured according to ASTM F1927-07 at 80% RH (and 23° C.), which is a considerable humidity.

According to an embodiment of said second aspect, said layer has coat weight in the interval of 0.8 to 8.0 g/m$^2$, preferably 1.2-4.0 g/m$^2$, and more preferably 1.6-3.2 g/m$^2$. One currently preferred interval is about 2 to about 4 g/m$^2$.

As a third aspect, the present disclosure also makes available a packaging material comprising a PVOH-based barrier layer according to the above second aspect and embodiments thereof.

In a preferred embodiment of said third aspect, the present disclosure makes available a packaging material comprising a PVOH-based barrier layer having a coat weight in the interval of 0.8 to 8.0 g/m$^2$, preferably 1.2-4.0 g/m$^2$, and more preferably 1.6-3.2 g/m$^2$ and an OTR in the interval 0.1 to 3 ml/m$^2$ day atm measured according to ASTM F1927-07 at a relative humidity (RH) of 50% and 23° C., and preferably a similarly reduced OTR also at high humidity conditions when measured using the same standard, preferably an OTR of 0.5-3 ml/m$^2$ day atm at 80% RH and 23° C.

A fourth aspect relates to a package comprising a paper substrate having a PVOH-based layer according to any one of the second aspect and embodiments thereof, or comprising a packaging material according to any one of the third aspect and embodiments thereof. Such package is preferably a package for an edible product, a foodstuff, a beverage or a pharmaceutical. In these applications, for packaging sensitive and/or perishable products, the improved barrier properties become particularly advantageous.

Without wishing to be bound by theory, the present inventors believe that an important advantage of the presently claimed approach is that the drying step, i.e. the removal of the solvent, allows a dense stacking of the polymer chains before the crosslinking takes place. In the prior art methods however, the presence of a crosslinking agent in the coating solution is likely to lead to premature crosslinking before the drying step. The resulting crosslinked film will therefor remain slightly porous and thus permeable. Hence, the small (Angstrom size) gas molecules have the ability, albeit somewhat restricted, to diffuse through the polymer layer.

By introducing an intermediate drying step, and an optional heating step, the present inventors surprisingly produced a PVOH-based barrier layer exhibiting reduced OTR also at high humidity conditions such as 80% RH or higher.

EXAMPLES

The inventors have performed extensive experimental work using a non-modified PVOH layer as reference, obtaining improved barrier properties at high relative humidity.

Materials

PET-plastic films were used as the substrates for film forming in this experimental set-up.

KURARAY POVAL® 15-99 (Kuraray America Inc.) was used as the PVOH in the experiments. This polymer has a degree of hydrolysis of 99% and a viscosity of 12.5-17.5 mPa·s (measured at 4% (w/w)).

Other components were: CLOISITE-Na+ (Southern Clay Products/BYK Additives & Instruments), which is a microgranulated nanofiller. LUTENSOL® ON70 (BASF/BTC Europe GmbH) is a fatty alcohol ethoxylate. $Zn(NO_3)_2$ was purchased from Fisher Scientific.

Glutaraldehyde (in the form of a 50% aqueous solution) and nonionic polyacrylamide with $M_n$ of about 150 kg/mol corresponding to $M_w$ 400 kg/mol (NPA) were purchased from Sigma Aldrich.

Poly(methyl vinyl ether-alt-maleic acid) with Mn of about 80 kg/mol corresponding to $M_w$ 216 kg/mol ($PMV_{low}$) was kindly provided by Ashland.

Tap water was used in all experiments.

Methods

1. Preparation of Polymer Solutions

The PVOH-PMV solutions were prepared by adding the polymers to water under continuous stirring at room temperature, prior to heating for one hour at 95° C.

PVOH-NPA solutions were prepared by first preparing stock solutions of the different polymers. PVOH (ca 9% (w/w)) was prepared by mixing at 95° C. for one hour, and NPA (1% (w/w)) was prepared through continuous stirring overnight at room temperature. The NPA was added to the PVOH solution at 60° C. under stirring. The system was thereafter removed from the heater and stirred for an additional period of ten minutes.

In the studies in which nanofiller (CLOISITE-Na+) was employed, the nanofiller was first dispersed in water (during ten minutes), before the addition of PVOH (and subsequent heating).

LUTENSOL® NO70 (10% based on the weight of the polymer/s) was added to the polymer (nanofiller) blends at 40° C. to improve the performance in curtain coating. Curtain coating was however not used in the testing described below.

2. Coating of the Substrate with PVOH-Based Formulations

The polymeric solutions were applied on the plastic substrate by a laboratory rod-coater, resulting in a grammage of 2-3 g/m². The coating was thereafter dried by IR.

3. Crosslinking of the Barrier Films

A solution containing glutaraldehyde (0.1% (w/w)) and $Zn(NO_3)_2$ (0.08% (w/w)) was prepared by mixing the components for thirty minutes. Substrates, coated with the different PVOH-based formulations, were immersed in this solution (at 25° C. or 60° C.) for five seconds, and immediately dried by IR, followed by immediate drying for two minutes at 140° C. in an oven. It is noted that the post-treatment ("curing") improves the effectiveness of the crosslinking.

4. Barrier Properties

The OTR (measured at 80% RH and 23° C.) of the coated films were measured using an OX-TRAN® instrument from Mocon Inc. according to ASTM F1927-07. The oxygen permeation rates (OP) of the different systems were calculated by normalization of the measured OTR values with the thickness of the coating. Preliminary thickness values (about 1 to 2 µm) were obtained by SEM measurements.

Results

The results are summarized in Table 1. A non-modified PVOH layer is used as comparison, and the measured OTR compared to that of the non-modified layer. When evaluating the results, it should be kept in mind that the coating thickness was in the order of 1-3 µm. It should also be emphasized that the experimental methods have not been optimized, and the properties of the barrier layers have determined when testing the layers individually, and not in a sandwich construction as they would be used in the packaging industry.

TABLE 1

Comparative examples. OP means oxygen permeability. OTR means oxygen transmission rate. Unless otherwise indicated, the temperature of the crosslinking solution was 25° C.

| Barrier composition | ≈OP* 80% RH | Thickness | ≈OTR** 80% RH | ≈OTR/ $OTR_{PVOH}$ 80% RH | ≈OTR** 50% RH | ≈$OTR_{80}$/ $OTR_{50}$ |
|---|---|---|---|---|---|---|
| PVOH | 18 | 1.6 | 11 | 1 | 6 | 2 |
| PVOH crosslinked with glutaraldehyde | 8 | 1.6 | 6 | 0.5 | 2 | 2 |
| PVOH crosslinked with glutaraldehyde (60° C.) | 3 | 1.6 | 2 | 0.2 | 1 | 2 |
| PVOH 10%(w/w) nanofiller | 13 | 1.8 | 7 | 0.6 | 3 | 2 |

TABLE 1-continued

Comparative examples. OP means oxygen permeability. OTR means oxygen transmission rate. Unless otherwise indicated, the temperature of the crosslinking solution was 25° C.

| Barrier composition | ≈OP* 80% RH | Thickness | ≈OTR** 80% RH | ≈OTR/OTR$_{PVOH}$ 80% RH | ≈OTR** 50% RH | ≈OTR$_{80}$/OTR$_{50}$ |
|---|---|---|---|---|---|---|
| PVOH 10%(w/w) nanofiller crosslinked with glutaraldehyde | 13 | 1.8 | 7 | 0.6 | 2 | 3 |
| PVOH-PMV$_{low}$ | 9 | 1.8 | 5 | 0.5 | N/A | N/A |
| PVOH-PMV$_{low}$ crosslinked with glutaraldehyde | 4 | 1.8 | 2 | 0.2 | N/A | N/A |
| PVOH-PMV$_{low}$ crosslinked with glutaraldehyde (60° C.) | 2 | 1.8 | 1 | 0.1 | N/A | N/A |
| PVOH-PMV$_{low}$ 10%(w/w) nanofiller | 4 | 1.9 | 2 | 0.2 | 1 | 2 |
| PVOH-PMV$_{low}$ 10%(w/w) nanofiller crosslinked with glutaraldehyde | 2 | 1.9 | 1 | 0.1 | N/A | N/A |
| PVOH-PMV$_{low}$ 10% nanofiller crosslinked with glutaraldehyde (60° C.) | 2 | 1.9 | 1 | 0.1 | N/A | N/A |
| PVOH-NPA | 8 | 1.3 | 6 | 0.5 | 3 | 2 |
| PVOH-NPA crosslinked with glutaraldehyde | 5 | 1.3 | 4 | 0.4 | 3 | 1 |

*Unit: ml μm/m$^2$ day atm
**Unit: ml/m$^2$ day atm

It can be seen from Table 1 that the crosslinking of a dried PVOH film resulted in a reduction of the OTR from 11 to 6 ml/m$^2$ day atm at 80% RH and from 6 to 2 ml/m$^2$ day atm at 50% RH. The OTR values were further improved, and reduced to 2 ml/m$^2$ day atm (80% RH) and 1 ml/m$^2$ day atm (50% RH) when the crosslinking agent was added at a temperature of 60° C. instead of 60° C. Similar effects were obtained when an inter-polymer complexation (IPC) polymer (PMV$_{low}$ or NPA) was present, but the temperature effect was smaller.

The lowest OTR values at 80% RH were obtained when the dried PVOH coating (that was subjected to crosslinking) comprised both an IPC polymer (PMV$_{low}$, M$_w$ 216 kg/mol) and nanofiller or when it comprised the IPC polymer and was crosslinked at 60° C. That being said, remarkably low OTR values were obtained also without such additives.

The results indicate that highly desirable barrier properties, in particular barrier properties at high relative humidity, can be achieved by a process which is well suited for industrial application. It may also be possible to produce barrier layers which do not need to be covered with additional protecting layers, which is required in many competing processes.

Without further elaboration, it is believed that a person skilled in the art can, using the present description, including the examples, utilize the present invention to its fullest extent. Also, although the invention has been described herein with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCES

U.S. Pat. No. 6,444,750—PVOH-based coating solutions, Robert E. Touhsaent WO 2004/089624—Packaging, Arnoldus J. Kruger and Patricia A. Truter
WO 2010/129032—Barrier coatings post-treated with multi-valent metal cations, Carrie A. Feeney et al.
WO 2013/064500—Coating composition, a method for coating a substrate, a coated substrate, a packaging material and a liquid packaging, Johan Larsson and Anders Karlsson
Labuschagne P W, Germishuizen W A, C. Verryn S M, Moolman F S (2008) Improved oxygen barrier performance of poly(vinyl alcohol) films through hydrogen bond complex with poly(methyl vinyl ether-co-maleic acid), European Polymer Journal 44:2146-2152 doi: https://doi.org/10.1016/j.eurpolymj.2008.04.015
Lim M, Kim D, Seo J (2016) Enhanced oxygen-barrier and water-resistance properties of poly(vinyl alcohol) blended with poly(acrylic acid) for packaging applications, Polymer International 65:400-406 doi:10.1002/pi.5068

The invention claimed is:

1. A method for the production of a packaging material comprising a substrate and a gas barrier layer based on polyvinyl alcohol (PVOH), said method comprising the steps of:
    applying a coating composition of said PVOH dissolved in a first solvent onto said substrate to form a coating;
    subjecting the coating to a first drying step to form a dried PVOH-based coating on said substrate, wherein the dried PVOH-based coating comprises regions of crystallized PVOH structures separated by regions of amorphous PVOH;
    contacting the dried PVOH-based coating with a crosslinking solution comprising a crosslinking agent in a second solvent, to effect crosslinking of the PVOH-based coating; and
    subsequent to the contact with the crosslinking solution, subjecting the PVOH-based coating to
        a second drying step, forming the PVOH-based barrier layer on said substrate;
with the proviso that if the crosslinking solution comprises PVOH, the amount of PVOH added by the crosslinking solution is less than 20% (by weight) of the amount of PVOH added by the coating composition.

2. The method according to claim 1, wherein in case the crosslinking solution comprises PVOH, the weight ratio of crosslinking agent to PVOH in the crosslinking solution is at least 2:3.

3. The method according to claim 1, wherein the dried PVOH-based coating formed after said first drying step is subjected to a heating step before the contact with the crosslinking solution, during which heating step said coating is heated to a temperature above the boiling temperature of said first solvent.

4. The method according to claim 1, wherein a second heating step is performed after said second drying step, during which heating step the barrier layer is heated to a temperature above the boiling temperature of said second solvent.

5. The method according to claim 1, wherein the crosslinking agent is chosen from the group consisting of glutaraldehyde, glyoxal, borates, and derivatives thereof.

6. The method according to claim 1, wherein the crosslinking solution that is contacted with the dried PVOH-based coating has a temperature of at least 40° C.

7. The method according to claim 1, wherein the degree of crosslinking is controlled by controlling the temperature of the crosslinking solution added to said PVOH-based coating.

8. The method according to claim 1, wherein no rinsing of the PVOH-based coating is carried out prior to the second drying step.

9. The method according to claim 1, wherein the coating composition further comprises an inter-polymer complexation (IPC) polymer having a weight average molecular weight (Mw) in an interval of 10 kg/mol to 10 000 kg/mol.

10. The method according to claim 9, wherein the IPC polymer is chosen from polyacrylic acid, polyvinyl pyrrolidone, non-ionic polyacrylamide or poly(methyl vinyl ether-alt-maleic acid).

11. The method according to claim 9, wherein the IPC polymer or polymers is present in the coating composition in an interval of about 0.5 to about 20 weight-%, based on the weight of the PVOH component.

12. The method according to claim 1, wherein the coating composition further comprises a nanofiller.

13. The method according to claim 1, wherein the substrate is a fiber based substrate.

14. The method according to claim 13, wherein the fiber based substrate is chosen from a paper substrate or a paper or paperboard comprising at least one fiber based layer.

* * * * *